United States Patent [19]

Inoue et al.

[11] 4,043,658
[45] Aug. 23, 1977

[54] ELECTROPHOTOGRAPHIC PHOTOSENSITIVE MEMBER

[75] Inventors: Shozo Inoue, Fussa; Tadashi Sato, Kokubunji, both of Japan

[73] Assignee: Canon Kabushiki Kaisha, Tokyo, Japan

[21] Appl. No.: 621,230

[22] Filed: Oct. 9, 1975

Related U.S. Application Data

[60] Division of Ser. No. 487,308, July 10, 1974, abandoned, which is a continuation of Ser. No. 72,589, Sept. 16, 1970, abandoned.

[30] Foreign Application Priority Data

Sept. 25, 1969 Japan .................................. 44-76685

[51] Int. Cl.² ................................................ G03G 15/00
[52] U.S. Cl. ................................ 355/10; 118/DIG. 23
[58] Field of Search .................... 355/10; 96/1 LY; 118/DIG. 23

[56] References Cited

U.S. PATENT DOCUMENTS

| | | | |
|---|---|---|---|
| 3,001,888 | 9/1961 | Metcalfe et al. | 427/15 |
| 3,079,890 | 3/1963 | Oliphant | 118/637 |
| 3,284,224 | 11/1966 | Lehmann | 355/10 X |
| 3,627,410 | 12/1971 | Jugle | 355/10 X |

*Primary Examiner*—Richard L. Moses
*Attorney, Agent, or Firm*—Fitzpatrick, Cella, Harper & Scinto

[57] ABSTRACT

The electrophotographic photosensitive member for use in electrophotographic copying machines comprises a photoconductive layer and a support. Such photosensitive member is provided with means formed in a portion or portions outside of the image forming portion thereof in order to prevent the developing solution from flowing out from the side edges of the member.

6 Claims, 8 Drawing Figures

ELECTROPHOTOGRAPHIC PHOTOSENSITIVE MEMBER

This is a division of application Ser. No. 487,308 now abandoned filed July 10, 1974, which, in turn, is a continuation of application Ser. No. 72,589 now abandoned, filed Sept. 16, 1970.

The present invention relates to in general an electrophotographic photosensitive member for use in an electrophotographic copying machine, and more particularly to a photosensitive member for use in a wet electrophotographic process and provided with means for preventing the developing solution from flowing past the sides of the photosensitive member.

The photosensitive members are used in the electrophotographic processes as disclosed in U.S. Pat. Nos. 2,221,776, 2,297,691 and 2,357,809 in which the surface of the photosensitive member consisting of a support made of electrically conductive material and a photoconductive layer is charged uniformly, the light image of an original to be reproduced is projected upon the charged surface so as to produce an electrostatic latent image, the latent image is developed by the toner and the toner image is transferred to a recording medium such as paper and is fixed. There has been known an electrophotographic photosensitive member of the type disclosed in U.S. Pat. No. 3,234,019, which has a protective layer applied to the surface of the photosensitive member.

There has been known the electrophotographic photosensitive member of the type used in an electrophotographic process disclosed in U.S. Pat. No. 3,438,706, assigned to the same applicant and in which the surface of an insulating layer overlaid upon a photoconductive layer is uniformly charged, an electrostatic latent image is produced by projecting the light image of an original to be reproduced while contemporaneously applying the charge with the polarity opposite to that of the charge previously applied or AC corona discharge, the whole surface is illuminated so as to enhance the contrast of the electrostatic latent image, the latent image thus formed is developed, transferred and fixed. In addition to the electrophotographic processes of the type described, various processes have been proposed and used in practice with various types of photosensitive members.

The present invention is applied to a photosensitive member capable of being used repetitively in a wet electrophotographic process. The photosensitive members for use in the wet electrophotographic process are in the forms of a flat sheet, a cylinder and an endless belt as shown in FIGS. 1A, 1B and 1C. In general, the photosensitive members such as 3A, 3B and 3C consist of photoconductive layers such as 1A, 1B and 1C and supports such as 2A, 2B and 2C. When these photosensitive members are used in wet electrophotographic processes in which developing solution is caused to flow over one of the surfaces of the photosensitive member, the member is immersed in the developing solution, or the developing solution is sprayed over the surface of the photosensitive member, the developing solution tends to flow over the side edges of the photosensitive member so that the image quality is degraded and the machine is corroded by the developing solution, thus causing breakdown.

Therefore, a primary object of the present invention is to provide an improved electrophotographic photosensitive member which may prevent the developing solution from flowing out from the side edges thereof.

It is another object of the present invention to provide an improved electrophotographic photosensitive member provided with means for preventing the developing solution from flowing over the side edges of the photosensitive member, said means being formed in a portion outside of an image forming portion of the member.

It is another object of the present invention to provide an improved electrophotographic photosensitive member provided with means for preventing the developing solution from flowing over the side edges of the photosensitive member and collecting the excess developing solution to a predetermined position.

An electrophotographic photosensitive member in accordance with the present invention is provided with grooves or ridges in suitable dimensions formed along the side edges of the member so that the excess developing solution used in the wet electrophotographic processes may be collected from the image forming surface into the grooves or toward the bases of the ridges, thereby preventing the developing solution from flowing further toward the side surfaces. The excess developing solution collected in the grooves or toward the bases of the ridges flows toward a suitable reservoir or the like.

The present invention will become more apparent from the following description of the preferred embodiments thereof taken in conjunction with the accompanying drawings in which.

Figure 4:
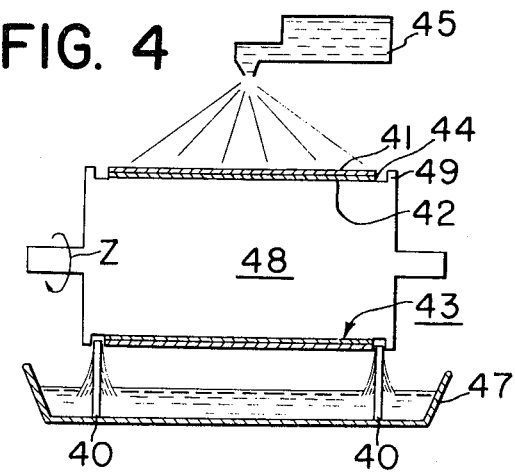
Figure 5A:
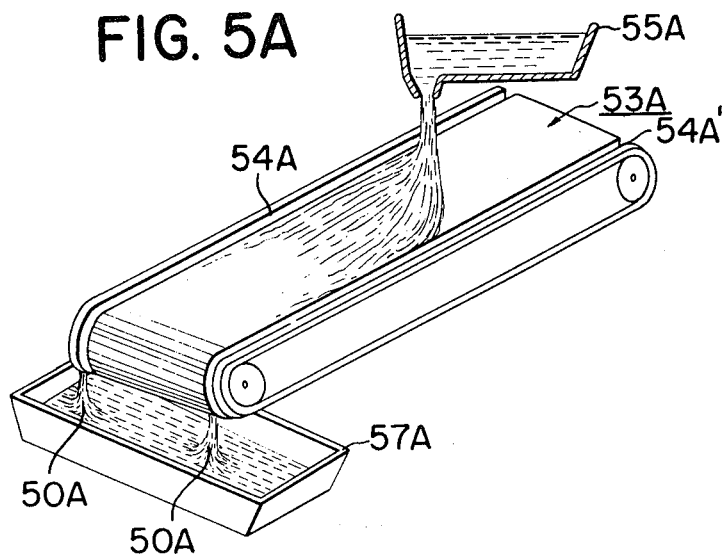
Figure 5B:
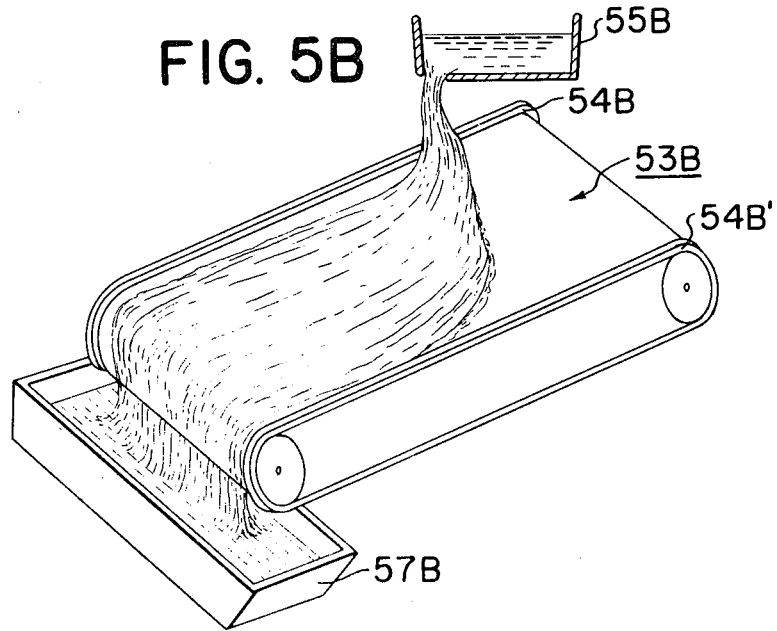

FIG. 4 is a schematic sectional view illustrating an improved cylindrical electrophotographic photosensitive member used in a wet process in which the developing solution is sprayed over the surface of the photosensitive member; and FIGS. 5A and 5B are perspective views illustrating improved electrophotographic photosensitive members in the form of endless belts used in a wet process in which the developing solution is cascaded over the surface of the photosensitive member.

Figure 1A:
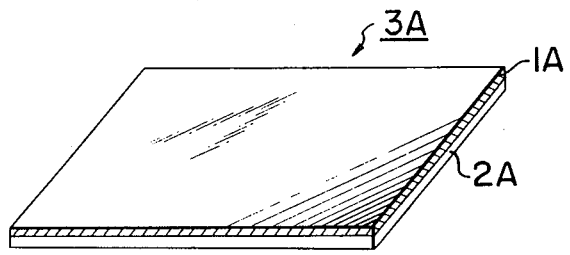
FIGS. 1A, 1B and 1C are schematic perspective views of the conventional electrophotographic photosensitive members.
Figure 1B:
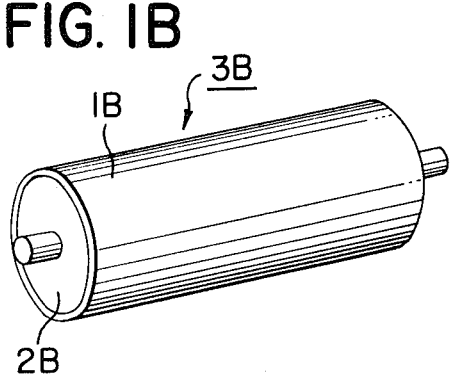
Figure 1C:
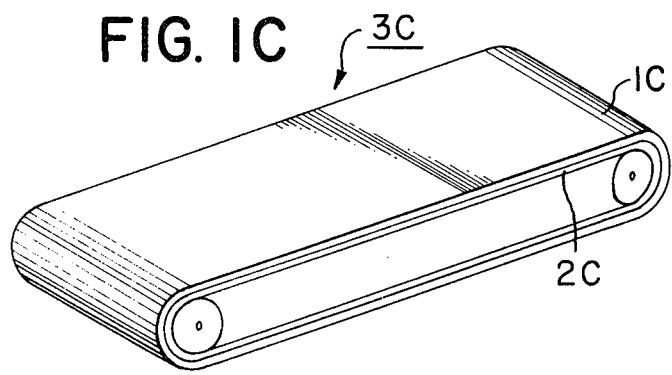
Figure 2:
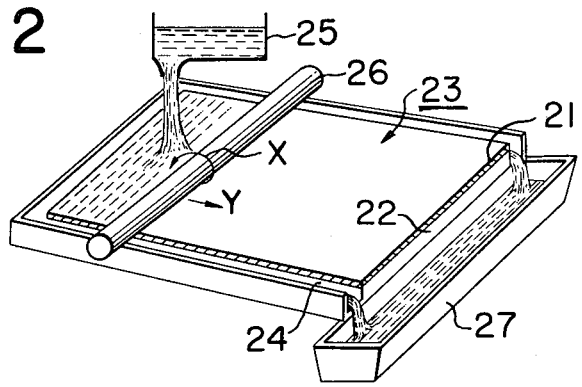
FIG. 2 is a perspective view of an improved electrophotographic photosensitive member in accordance with the present invention for use in a wet electrophotographic process in which the developing solution is cascaded over the flat surface of the photosensitive member.

Referring to FIG. 2, an electrophotographic photosensitive member generally designated by 23 comprises a photoconductive member 21 and a support 22 and is provided with grooves 24 formed along the opposite side edges of the photosensitive member 23. The developing solution from a container 25 is cascaded over the surface of the photosensitive member 23 while a roller 26 rotating in the direction opposite to the direction indicated by X is advanced in the direction indicated by Y, thereby developing the electrostatic latent image formed upon the surface of the photosensitive member 23. In this case, the developing solution is spread over the surface by the roller 26 and collected into the grooves 24 from which the developing solution flows into a receptacle 27.

Figure 3:
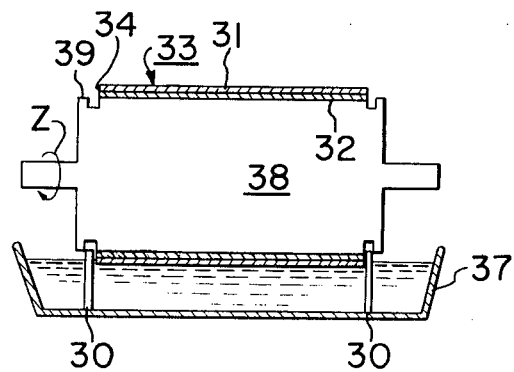
FIG. 3 is a diagrammatic sectional view illustrating an improved cylindrical electrophotographic photosensitive member in accordance with the present invention for use in a wet process in which the photosensitive member is immersed in the developing solution.

Referring to FIGS. 3 and 4, cylindrical photosensitive members generally designated by 33 and 43 comprise photosensitive members 31 and 41 and supports 32 and 42 disposed on drums 38 and 48, respectively, and such structures will be referred to as "photosensitive drums" hereinafter. The photosensitive drums 38 and 48 are provided with annular grooves 34 and 44 formed along the lateral side edges thereof, respectively. In the photosensitive drum 38, the outer walls 39 of the grooves 34 are made lower than the peripheral surface of the photosensitive drum 38 because the latter is used in a wet process in which the drum 38 is partly immersed in the developing solution. In case of the photosensitive drum 48 which is used in a wet process in which the developing solution is sprayed over the peripheral surface of the drum 48, the outer walls 49 of the grooves 44 may be in flush with the peripheral surface of the drum 48.

The photosensitive drum 38 rotates in the direction indicated by Z and the developing solution at the top of the drum may flow into the grooves 34, from which the developing solution returns to a developing solution reservoir 37. In case of the photosensitive drum 48, the excess developing solution sprayed from a developing solution tank 45 is also collected into the grooves 44, from which the developing solution may flown into a receptacle 47.

Electrophotographic photosensitive members in the form of endless belts illustrated in FIGS. 5A and 5B and generally designated by 53A and 53B each comprise a photosensitive layer and a support and are provided with grooves 54A and 54A', and ridges 54B and 54B' respectively. Excess developing solution may be collected into the grooves 54A and 54A' to flow into a receptacle 57A in FIG. 5A and the solution may be made to flow along the ridges 54B and 54B' into a receptacle 57B in FIG. 5B.

In case of the photosensitive druus 38 and 48 and the photosensitive members in the form of endless belts 53A and 53B, scrapers 30, 40, 50A and 50B made from felt or the like may be interposed between the grooves or ridges and the receptacles or reservoir so as to effectively collect the developing solution to the desired portions.

In addition to the embodiments described hereinabove with reference to FIGS. 2 through 5B, the present invention may be applied to many other electrophotographic photosensitive members used in wet processes. The developing solution may be prevented from flowing toward the side edges thereof by providing the grooves or ridges along the side edges of the photosensitive members, so that the damage to the image may be prevented and that the breakdown of the copying machines may be also prevented. Since the excess developing solution may be removed from the surface of the photosensitive member, the electrostatic latent images may be developed with a uniform quantity of developing solution so that the better quality images may be produced.

What is claimed is:

1. An electrophotographic apparatus comprising:
a rotatable electrophotographic member having an electrophotographic photosensitive layer fixed on the periphery thereof, said electrophotographic photosensitive layer being for repeated use;
guiding means comprising a groove for preventing developing liquid from flowing outwardly of the lateral edges of said rotatable member and for guiding the developing liquid to a developing liquid reservoir, said groove being provided along at least one lateral end of said rotatable electrophotographic member;
means for forming an electrostatic latent image on said electrophotographic member;
means for developing an electrostatic latent image formed by said electrostatic latent image forming means;
means for transferring the image developed by said developing means.

2. In an electrophotographic copying machine, the combination comprising an endless photosensitive member on which sequentially repetitive electrophotographic images are visualized by a liquid developing solution, said photosensitive member having a rotatable drum, a developing solution reservoir disposed adjacent said drum so that only the exterior surface of said photosensitive member is immersed in said developing solution when said drum is rotated, and an annular groove formed along each side edge of said photosensitive member for collecting excess developing solution which flows toward said side edges.

3. In an electrophotographic copying machine, the combination comprising an endless photosensitive member on which sequentially repetitive electrophotographic images are visualized by a liquid developing solution, said photosensitive member having a rotatable drum, means for spraying said developing solution over the peripheral surface of said photosensitive member, and reservoir means mounted under said drum for collecting said developing solution, and an annular groove formed along each side edge of said photosensitive member for collecting excess developing solution which flows toward said side edges.

4. In an electrophotographic copying machine, the combination comprising an endless belt-like photosensitive member mounted between spaced supports for continuous movement during operation and on which sequentially repetitive electrophotographic images are visualized by a liquid developing solution, wherein said spaced supports are positioned at opposed ends of an upper surface of said belt-like member, means for causing the flow of said developing solution over the upper surface of said photosensitive member toward one end thereof, a receptacle mounted adjacent said one end for collecting the developing solution, and an annular groove formed along each side edge of said photosensitive member for collecting excess developing solution and causing it to flow toward said receptacle.

5. In an electrophotographic copying machine, the combination comprising an endless belt-like photosensitive member on which sequentially repetitive electrophotographic images are visualized by a liquid developing solution, said photosensitive member being mounted between spaced supports for continuous movement during operation wherein said spaced supports are positioned at opposed ends of an upper surface of said belt-like member, means for causing developing solution to flow over the upper surface of said photosensitive member towards one end thereof, a receptacle mounted adjacent said one end for collecting said developing solution, and a ridge formed along each side edge of said photosensitive member along which excess developing solution flows toward said receptacle.

6. In an electrophotographic copying machine, the combination comprising a photosensitive member on which sequentially repetitive electrophotographic images are visualized by a liquid developing solution, means for causing said developing solution to flow over the upper surface of said photosensitive member towards one end thereof, said means including a roller mounted for rolling over the exposed surface of said photosensitive member to spread said developing solution over said surface, a receptacle disposed adjacent said one end for receiving said developing solution, and a groove formed along each side edge of said photosensitive member for collecting excess developing solution and causing it to flow toward said receptacle.

* * * * *